US012658383B2

(12) United States Patent
Ge

(10) Patent No.: US 12,658,383 B2
(45) Date of Patent: Jun. 16, 2026

(54) WATERPROOF BUTTON STRUCTURE AND WEARABLE DEVICE

(71) Applicant: GOERTEK INC., Weifang (CN)

(72) Inventor: Liyuan Ge, Weifang (CN)

(73) Assignee: GOERTEK INC., Weifang (CN)

( * ) Notice: Subject to any disclaimer, the term of this patent is extended or adjusted under 35 U.S.C. 154(b) by 293 days.

(21) Appl. No.: 18/610,827

(22) Filed: Mar. 20, 2024

(65) Prior Publication Data

US 2024/0222044 A1 Jul. 4, 2024

Related U.S. Application Data

(63) Continuation of application No. PCT/CN2021/138304, filed on Dec. 15, 2021.

(30) Foreign Application Priority Data

Nov. 18, 2021 (CN) ........................ 202111372867.6

(51) Int. Cl.
*H01H 13/06* (2006.01)

(52) U.S. Cl.
CPC .................................. *H01H 13/06* (2013.01)

(58) Field of Classification Search
CPC ........... H01H 2213/00; H01H 2227/02; H01H 13/82; H01H 2223/002; H01H 9/342;
(Continued)

(56) References Cited

U.S. PATENT DOCUMENTS

| | | | | |
|---|---|---|---|---|
| 5,631,881 A | 5/1997 | Pessey et al. | | |
| 8,946,575 B2 * | 2/2015 | Kikuchi | H01H 13/063 | 200/341 |
| 2010/0155205 A1 * | 6/2010 | Liu | H01H 13/06 | 200/302.1 |

(Continued)

FOREIGN PATENT DOCUMENTS

| | | |
|---|---|---|
| CN | 1445627 A | 10/2003 |
| CN | 102004438 A | 4/2011 |

(Continued)

OTHER PUBLICATIONS

First Office Action in Corresponding Chinese Application No. 202111372867.6, dated Jun. 22, 2022; 13 pgs.

(Continued)

*Primary Examiner* — Ahmed M Saeed
(74) *Attorney, Agent, or Firm* — HAUPTMAN HAM, LLP

(57) ABSTRACT

A waterproof button structure applied to a wearable device having a button hole, including an installation sleeve, a button and a first sealing ring. The installation sleeve passes through the button hole and has a through hole. The button passes through the through hole and can move along an axial direction of through hole or rotate relative to the installation sleeve. An outer wall of button is provided with a first conical surface along a circumferential direction of button. An outer circumferential wall of first sealing ring is connected to a hole wall of through hole. The first sealing ring is sleeve on a periphery of button. An inner wall of first sealing ring is provided with a second conical surface along a circumferential direction of first sealing ring. The second conical surface and the first conical surface are at least partially abutted against and limited by each other.

12 Claims, 6 Drawing Sheets

(58) Field of Classification Search
CPC .... H01H 13/06; H01H 9/04; H01H 2239/034; H01H 2215/048; H01H 13/70; H01H 2009/048; H01H 2223/004
See application file for complete search history.

(56) References Cited

U.S. PATENT DOCUMENTS

| | | | | | |
|---|---|---|---|---|---|
| 2012/0152710 | A1 | 6/2012 | Liu | | |
| 2013/0313087 | A1* | 11/2013 | Le | H01H 13/06 | 200/302.2 |
| 2016/0365203 | A1 | 12/2016 | Hidai | | |
| 2023/0207232 | A1* | 6/2023 | Ye | H01H 13/14 | 200/302.2 |

FOREIGN PATENT DOCUMENTS

| | | | |
|---|---|---|---|
| CN | 104835668 | A | 8/2015 |
| CN | 105761986 | A | 7/2016 |
| CN | 105955519 | A | 9/2016 |
| CN | 206557974 | U | 10/2017 |
| CN | 207380454 | U | 5/2018 |
| CN | 209103109 | U | 7/2019 |
| CN | 209824239 | U | 12/2019 |
| CN | 213457813 | U | 6/2021 |
| CN | 214404667 | U | 10/2021 |
| JP | H10334759 | A | 12/1998 |
| WO | 2013044586 | A1 | 4/2013 |

OTHER PUBLICATIONS

Grant Notification in Corresponding Chinese Application No. 202111372867.6, dated Nov. 24, 2022; 5 pgs.
International Search Report and Written Opinion in International Application No. PCT/CN2021/138304, mailed Jun. 29, 2022; 14 pgs.

* cited by examiner

WATERPROOF BUTTON STRUCTURE AND WEARABLE DEVICE

CROSS-REFERENCE TO RELATED APPLICATIONS

This application is a continuation application of International Application No. PCT/CN2021/138304, filed on Dec. 15, 2021, which claims priority to Chinese Patent Application No. 202111372867.6, filed on Nov. 18, 2021. The above-mentioned applications are incorporated herein by reference in their entireties.

TECHNICAL FIELD

The present application relates to the technical field of smart wearable products, and in particular to a waterproof button structure and a wearable device.

BACKGROUND

Nowadays, smart wearable devices, such as smart watches and smart bracelets, are provided with functional buttons, which can be pressed or rotated to realize corresponding function selection and switching. Meanwhile, in order to realize a waterproof function of the smart wearable device, the functional buttons should also be designed for sealing and waterproofing.

In the related art, the functional button is sleeved with an installation sleeve, and a sealing ring is provided between the functional button and the inner wall of the installation sleeve to prevent moisture from the outside from entering the smart wearable device through the gap between the functional button and the inner wall of the installation sleeve. Since the gap between the functional button and the inner wall of the installation sleeve is extremely narrow, the actual contact area of the sealing ring with the functional button and the installation sleeve is so small that the pressing force applied by the functional button and the installation sleeve to the sealing ring is not sufficient, resulting in that when the functional button rotates relative to the installation sleeve or moves along the axial direction of the installation sleeve, the sealing ring will easily malfunction, and a moisture leakage will occur between the functional button and the inner wall of the installation sleeve. As a result, the waterproof performance of the functional button is not reliable enough.

SUMMARY

A main objective of the present application is to propose a waterproof button structure, aiming to improve the reliability of waterproofing of the button structure.

To achieve this objective, the waterproof button structure proposed in the present application is applied to a wearable device, the wearable device is provided with a button hole, and the waterproof button structure includes an installation sleeve, a button and a first sealing ring. The installation sleeve passes through the button hole and is provided with a through hole. The button passes through the through hole and can move along an axial direction of the through hole or rotate relative to the installation sleeve. An outer wall of the button is provided with a first conical surface along a circumferential direction of the button. An outer circumferential wall of the first sealing ring is connected to a hole wall of the through hole, and the first sealing ring is sleeve on a periphery of the button. An inner wall of the first sealing ring is provided with a second conical surface along a circumferential direction of the first sealing ring, and the second conical surface and the first conical surface are at least partially abutted against and limited by each other.

In an embodiment of the present application, the first sealing ring includes a connection part and an extension part. The connection part is configured to be ring-shaped, and an outer circumferential wall of the connection part is connected to the hole wall of the through hole. The extension part is circumferentially provided on an inner circumferential wall of the connection part. The extension part is configured to be conical, and an end of the extension part away from the connection part is provided with a limit hole. The button passes through the limit hole, and the second conical surface is provided on an inner circumferential wall of the extension part.

In an embodiment of the present application, the hole wall of the through hole is provided with a dovetail groove, and the dovetail groove is provided along a circumferential direction of the installation sleeve. The connection part is accommodated in and limited by the dovetail groove, and the extension part passes through an opening of the dovetail groove to extend into the through hole.

In an embodiment of the present application, an angle between the extension part and the axial direction of the through hole is defined as $\alpha$, an angle between the first conical surface and the axial direction of the through hole is defined as $\beta$, and $\alpha$ is greater than $\beta$.

In an embodiment of the present application, the installation sleeve includes an outer sleeve and an inner sleeve. The outer sleeve passes through the button hole and is provided with a passage hole, and a hole wall of the passage hole is provided with a limit ring groove. The inner sleeve is partially accommodated in and limited by the limit ring groove. The inner sleeve is provided with the through hole, and the through hole and the passage hole are configured to be coaxial.

In an embodiment of the present application, the hole wall of the passage hole is provided with a protrusion part and a first clamping groove along a circumferential direction of the inner sleeve, and the protrusion part and the first clamping groove are spaced apart. The waterproof button structure further includes a circlip. One end of the circlip is accommodated in and limited by the first clamping groove, and the other end of the circlip passes through an opening of the first clamping groove and encloses together with the hole wall of the passage hole and the protrusion part to form the limit ring groove. The button penetrates the protrusion part. One end of the inner sleeve is abutted against and limited by the protrusion part, and the other end of the inner sleeve is abutted against and limited by the circlip.

In an embodiment of the present application, an outer wall of the inner sleeve is provided with a second clamping groove along a circumferential direction of the inner sleeve. The waterproof button structure further includes a second sealing ring provided in the second clamping groove, and the second sealing ring is partially protruded from an opening of the second clamping groove and sealingly abutted against the outer sleeve.

In an embodiment of the present application, an end of the outer sleeve is provided with a flange, and the flange is configured to surround the passage hole. The waterproof button structure further includes a lock ring detachably connected to an end of the outer sleeve away from the flange. The flange is abutted against and limited by a periphery of one opening of the button hole, and the lock ring is abutted against and limited by a periphery of the other opening of the button hole.

In an embodiment of the present application, an outer wall of the outer sleeve is provided with a third clamping groove along a circumferential direction of the outer sleeve. The waterproof button structure further includes a third sealing ring provided in the third clamping groove. The third sealing ring is partially protruded from an opening of the third clamping groove and sealingly abutted against a hole wall of the button hole.

In an embodiment of the present application, the button includes a button shaft, a button cap and a nut. The button shaft passes through the passage hole. The first conical surface is provided on an outer circumferential wall of the button shaft. The button cap is located on an outer side of the button hole. A side of the button cap away from the button hole is provided with a limit recess. The nut is provided in the limit recess. The button cap and the nut are in threaded connection with an end of the button shaft extending out of the button hole.

In an embodiment of the present application, the outer circumferential wall of the button shaft is provided with a stop part. A side of the button cap away from the nut is abutted against and limited by the stop part when the button cap and the nut are connected to the button shaft.

In addition, the present application further proposes a wearable device, which includes a housing and the above-mentioned waterproof button structure. The housing is provided with an accommodation chamber and a button hole communicated with the accommodation chamber. The button of the waterproof button structure partially passes through the button hole and extends into the accommodation chamber.

In an embodiment of the present application, the wearable device further includes a first sensor and a second sensor both provided in the accommodation chamber. The first sensor is provided at an axial direction of the button for detecting an axial movement of the button. The second sensor is provided at a side of the button for detecting a rotation of the button.

In the technical solution of the present application, the installation sleeve passes through the button hole of the wearable device, the button passes through and can move in the through hole of the installation sleeve, the first sealing ring is provided between the hole wall of the through hole and the outer wall of the button, the second conical surface on the inner wall of the first sealing ring is at least partially abutted against and limited by the first conical surface on the outer wall of the button. In this way, when the button is not pressed, the first sealing ring may not deform, and the second conical surface on the inner wall of the first sealing ring can be completely abutted against and limited by the first conical surface on the outer wall of the button, thus the waterproof sealing between the button and the installation sleeve is realized. When the button is pressed and moves relative to the installation sleeve along the axial direction of the installation sleeve, the outer wall of the button presses and pushes the first sealing ring to deform, which makes the second conical surface on the inner wall of the first sealing ring being partially abutted against and limited by the first conical surface on the outer wall of the button, and the waterproof sealing between the button and the installation sleeve can also be realized. Since the first sealing ring and the button are in contact with each other over the first conical surface and second conical surface, the larger the contactable area between the first conical surface and the second conical surface, the greater the pressing force applied by the button to the first sealing ring, and the greater the interactional pressing force between the first conical surface of the button and the second conical surface of the first sealing ring, thus the tightness of the limiting and fitting between the button and the first sealing ring can be improved, and the reliability of the waterproof sealing between the button and the installation sleeve can be improved by the first sealing ring.

BRIEF DESCRIPTION OF THE DRAWINGS

In order to more clearly illustrate the technical solutions in the embodiments of the present application or in the related art, drawings that are needed to illustrate the embodiments or the related art are simply introduced below. Obviously, drawings in the following description are just some figures of the present application. For those of ordinary skill in the art, other figures can be further obtained without creative efforts according to the provided figures.

DETAILED DESCRIPTION OF THE EMBODIMENTS

Figure 1:
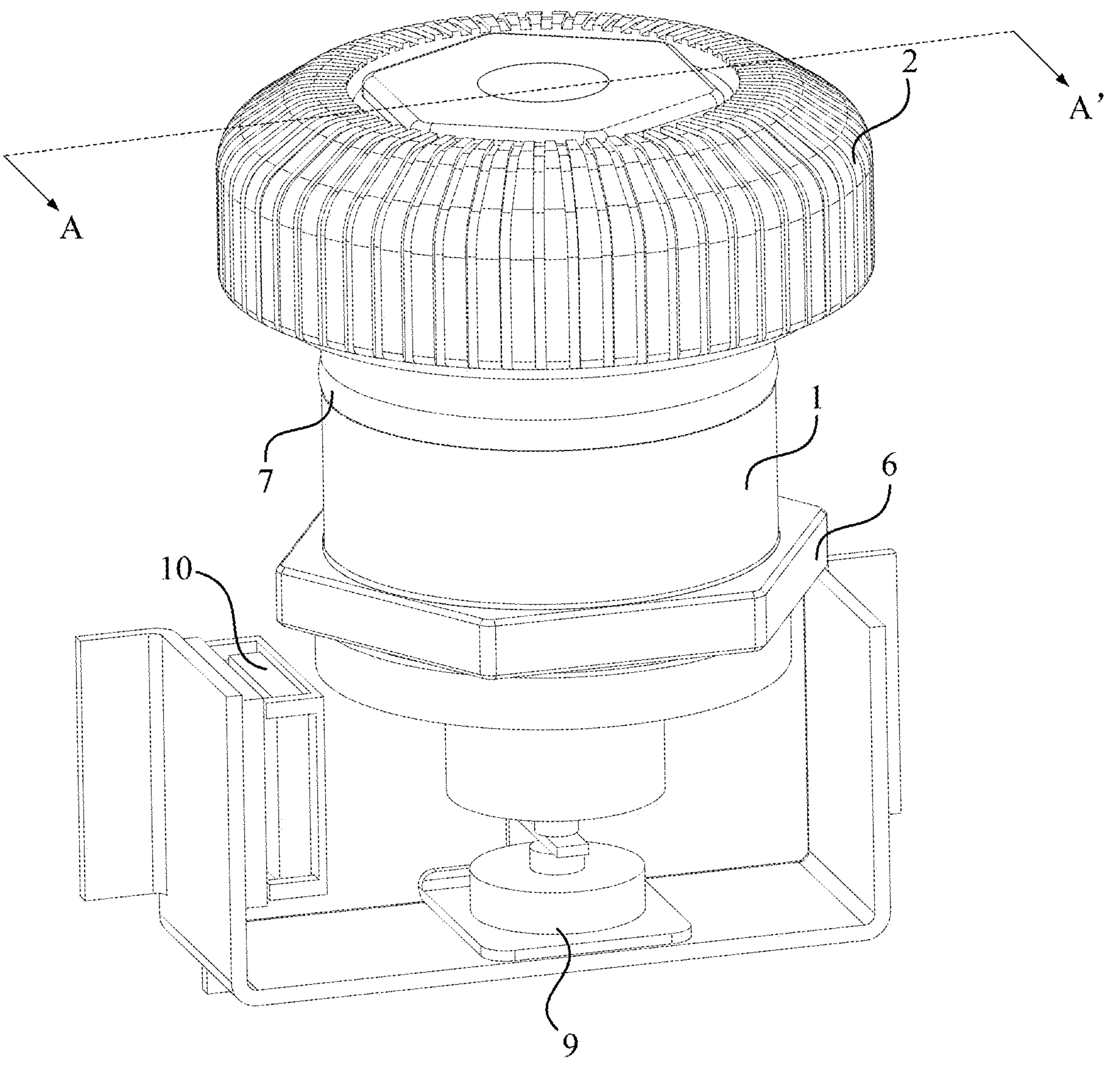
FIG. 1 is a schematic structural view of a waterproof button structure, a first sensor and a second sensor according to an embodiment of the present application.

The technical solutions of the embodiments of the present application will be clearly and completely described below in conjunction with the drawings in the embodiments of the present application. It is obvious that the embodiments to be described are only some rather than all the embodiments of the present application. All other embodiments obtained by those of ordinary skill in the art based on the embodiments of the present application without creative efforts should fall within the scope of the present application.

It should be noted that all the directional indications (such as up, down, left, right, front, rear, etc.) in the embodiments of the present application are only used to explain the relative positional relationship, movement, etc. among the components in a certain posture (as shown in the drawings). If the specific posture changes, the directional indication will change accordingly.

In the present application, unless otherwise specifically specified and limited, the terms "connected", "fixed", etc. should be understood in a broad sense, for example, "fixed" can be a fixed connection, a detachable connection, or be integrated as a whole; "connected" can be a mechanical connection or an electrical connection; can be directly connected, or indirectly connected through an intermediate medium, or can be the internal communication between two elements or the interaction relationship between two elements. For those of ordinary skill in the art, the specific meaning of the above-mentioned terms in the present application can be understood according to specific situations.

Besides, the descriptions associated with "first", "second", etc. in the present application are merely for descriptive purposes, and cannot be understood as indicating or suggesting the relative importance or implicitly indicating the number of the indicated technical feature. Therefore, the features defined with "first" or "second" can expressly or implicitly include at least one such feature. In addition, the meaning of "and/or" appearing in the present application includes three solutions. For example, "A and/or B" includes only A, or only B, or both A and B. Moreover, the technical solutions of the various embodiments can be combined with each other, but the combinations must be based on the realization by those of ordinary skill in the art. When the combination of technical solutions is contradictory or cannot be achieved, it should be considered that such a combination of technical solutions does not exist, nor does it fall within the scope of the present application.

The present application proposes a waterproof button structure, which is applied to a wearable device such as a smart bracelet or a smart watch.

Figure 2:
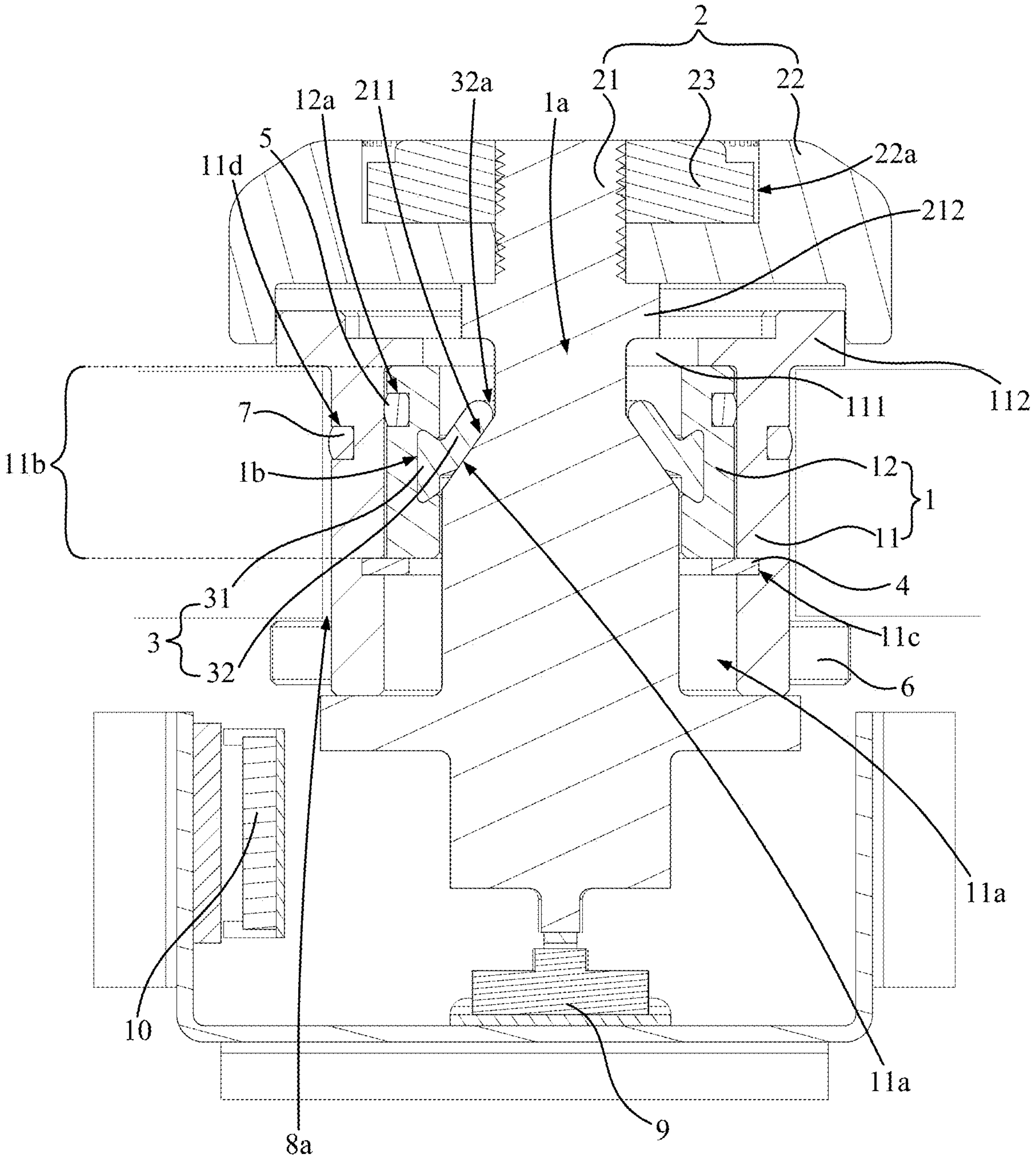
FIG. 2 is a cross-sectional view of the waterproof button structure in FIG. 1 in a non-pressed state taken along line A-A'.

In an embodiment of the present application, referring in combination with FIGS. 1 and 2, the wearable device is provided with a button hole 8*a*. The waterproof button structure includes an installation sleeve 1, a button 2, and a first sealing ring 3. The installation sleeve 1 passes through the button hole 8*a*. The installation sleeve 1 is provided with a through hole 1*a*. The button 2 passes through the through hole 1*a* and can move along an axial direction of the through hole 1*a* or rotate relative to the installation sleeve 1. An outer wall of the button 2 is provided with a first conical surface 211 along a circumferential direction of the button 2. An outer circumferential wall of the first sealing ring 3 is connected to the hole wall of the through hole 1*a*. The first sealing ring 3 is sleeved on a periphery of the button 2. An inner wall of the first sealing ring 3 is provided with a second conical surface 321 along a circumferential direction of the first sealing ring 3. The second conical surface 321 and the first conical surface 211 are at least partially abutted against and limited by each other.

In this embodiment, the button hole 8*a* may be opened at the housing 8 of a wearable device. The button hole 8*a* is configured for installing the installation sleeve 1. At least part of the installation sleeve 1 is accommodated in and limited by the button hole 8*a*, and may be fixedly connected to the housing 8 by means of clamping or threaded connection, etc. The installation sleeve 1 is provided with the through hole 1*a* along its axial direction. The through hole 1*a* and an accommodation chamber inside the housing 8 for installing functional modules of the wearable device are communicated. The button 2 passes through the through hole 1*a* of the installation sleeve 1, and can be detected by the sensor group in the accommodation chamber when rotating or moving along the axial direction of through hole 1*a*. The wearable device can respond to the operation of button 2 over functional modules that are electrically connected to the sensor group, to further control an execution terminal, such as a display or a speaker, to perform a corresponding action, such as displaying a picture or producing a sound, such that the information interaction between the wearable device and the user is achieved.

Figure 3:
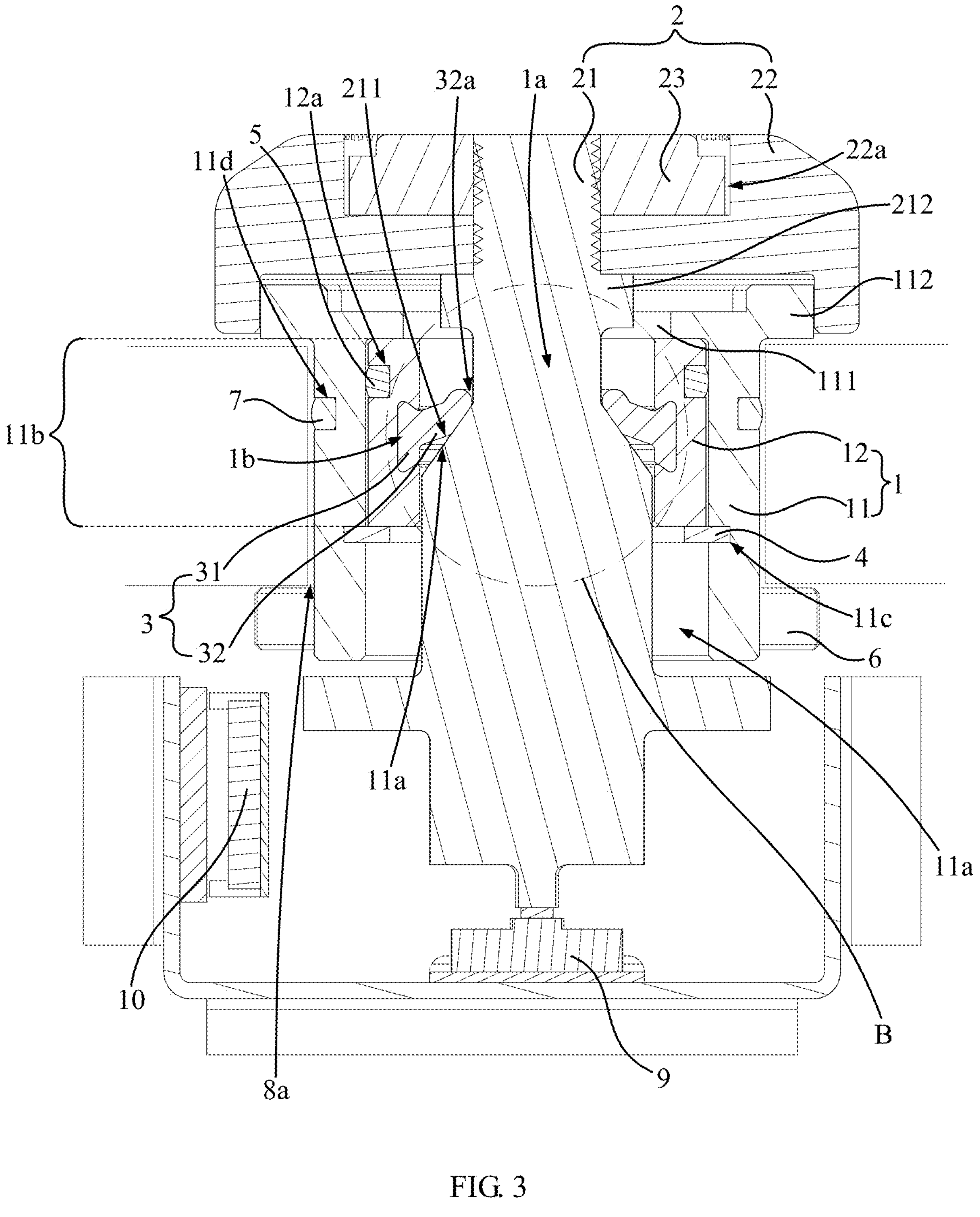
FIG. 3 is a cross-sectional view of the waterproof button structure in FIG. 1 in a pressed state taken along line A-A'.

The button 2 passes through the through hole 1. The first sealing ring 3 is provided on the hole wall of the through hole 1*a*. The center of first sealing ring 3 is formed with a limit hole 32*a*. The button 2 passes through the limit hole 32*a* and is sealingly abutted against the inner wall of limit hole 32*a*. The first sealing ring 3 is made of elastic materials such as rubber or silicone. The first conical surface 211 on the outer circumferential wall of the button 2 and the second conical surface 321 on the inner circumferential wall of the first sealing ring 3 are always abutted against and limited by each other, so that the waterproof sealing between the button 2 and the installation sleeve 1 is achieved. Specifically, referring in combination with FIGS. 2 and 3, when the button 2 is not pressed, the waterproof structure of button 2 is in the state as shown in FIG. 2. At this point, the button 2 has a tendency to move along the axial direction of the installation sleeve 1 to the outer side of the installation sleeve 1 under the elastic force of the elastic contact sheet inside the wearable device, this allows the first conical surface 211 on the outer wall of the button 2 to press and push the second conical surface 321 on the inner wall of the first sealing ring 3 upwards. When the elastic force of the elastic contact sheet applied to the button 2 and the frictional force between the first conical surface 211 and the second conical surface 321 come to a balance, the button 2 stays still relative to the first sealing ring 3, most or all the surface of the first conical surface 211 is abutted against and limited by the second conical surface 321, the outer circumferential wall of the sealing ring and the inner circumferential wall of the button 2 are tightly abutted and fitted, such that the moisture from the outside is prevented from entering the wearable device through the gap between installation sleeve 1 and button 2 by the sealing ring. When the button 2 is pressed, the waterproof structure of the button 2 is in the state as shown in FIG. 3. At this point, the button 2 moves along the axial direction of the installation sleeve 1 into the through hole 1*a* under the action of pressing force, which allows a portion of the button 2 where the limit hole 32*a* abuts to press and push the hole wall of the limit hole 32*a* downwards, and makes a portion of the first sealing ring 3 at the periphery of the limit hole 32*a* deform. In this case, an end of the second conical surface 321 away from the limit hole 32*a* partially detaches from the first conical surface 211, while an end of the second conical surface 321 close to the limit hole 32*a* applies a greater pressing force on the first conical surface 211, such that the moisture from the outside is prevented from entering the wearable device through the gap between the installation sleeve 1 and the button 2 by the sealing ring. It can be understood that the button 2 has a certain moving stroke and cannot be pressed into the accommodation chamber without limitation. In this case, the waterproofing effectiveness of the sealing ring can be further ensured by limiting the moving stroke of the button 2.

In the technical solution of this embodiment, the outer circumferential wall of the button 2 is provided with the first conical surface 211, the inner circumferential wall of the first sealing ring 3 is provided with the second conical surface 321, the first sealing ring 3 is in contact with and the button 2 over the first conical surface 211 and the second conical surface 321. The contactable area between the first conical surface 211 and the second conical surface 321 is relatively large, which allows that when the button 2 moves relative to the installation sleeve 1, the pressing force of the button 2 applied to the first sealing ring 3 is greater, and the interactional pressing force between the first conical surface 211 of the button 2 and the second conical surface 321 of the first sealing ring 3 is greater, so that the button 2 and the first sealing ring 3 can be abutted against and limited by each other more tightly, and the reliability of the waterproof sealing between the button 2 and the installation sleeve 1 is improved by the first sealing ring 3.

Figure 5:
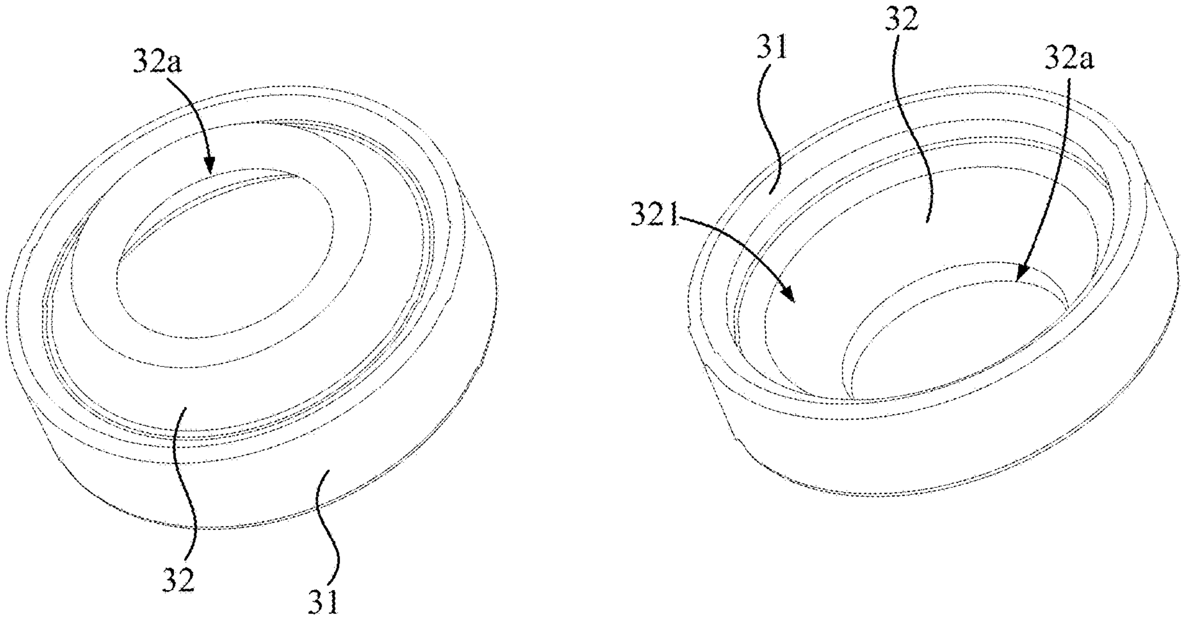
FIG. 5 is a schematic structural view of the first sealing ring in FIG. 2.

In an embodiment of the present application, referring in combination with FIGS. 2 and 5, the first sealing ring 5 includes a connection part and an extension part. The connection part 31 is configured to be ring-shaped, and the outer circumferential wall of the connection part 31 is connected to the hole wall of the through hole 1*a*. The extension part 32 is circumferentially provided on the inner circumferential wall of the connection part, and the extension part 32 is configured to be cone-shaped. An end of the extension part 32 away from the connection part 31 is provided with the limit hole 32*a*. The button 2 passes through the limit hole 32*a*. The second conical surface 321 is formed on the inner circumferential wall of the extension part 32. In FIG. 5, the left picture shows the first sealing ring 3 in a state of the front side facing upwards, while the right picture shows the first sealing ring 3 in a state of the reverse side facing upwards.

In this embodiment, the connection part 31 can be connected to the inner circumferential wall of the extension part 32 by means of clamping, inserting or adhering. An end of the extension part 32 away from the connection part 31 is extended towards an upper opening of the through hole 1*a*. The entire shape of the extension part 32 is conical. The outer circumferential wall of the extension part 32 is the outer conical surface, while the inner circumferential wall of the extension part 32 is the inner conical surface. The limit hole 32*a* is opened at the top of the outer conical surface of the extension part 32 and penetrates the inner conical surface of the extension part 32. The button 2 passes through the limit hole 32*a* and is abutted against the hole wall of the limit hole 32*a*. The arrangement of connection part 31 and conical extension part 32 allows the button 2 to press and push the extension part 32 to deform when the button 2 axially moves, and a portion of the extension part 32 at the periphery of the limit hole 32*a* can make the hole wall of the limit hole 32*a* and the button 2 stay being tightly abutted against each other by slightly bending outwards or inwards, and also can make the first conical surface 211 on the outer wall of the button 2 and the second conical surface 321 of the inner circumferential wall of the first sealing ring 3 stay being tightly abutted against each other, thereby improving the tightness of the limiting and fitting between button 2 and first sealing ring 3, and improving the reliability of the waterproof sealing between the button 2 and the installation sleeve 1 by the first sealing ring 3.

In an embodiment of the present application, referring in combination with FIGS. 2 and 3, the hole wall of the through hole 1*a* is provided with dovetail groove 1*b*. The dovetail groove 1*b* is provided along the circumferential direction of the installation sleeve 1. The connection part 31 is accommodated and limited in the dovetail groove 1*b*. The extension part 32 passes through the opening of the dovetail groove 1*b* and is extended into the through hole 1*a*.

In this embodiment, the entire shape of the connection part 31 fits with the dovetail groove 1*b*. For example, the connection part 31 can be wedge-shaped, the dovetail groove 1*b* is circumferentially provided and has two opposite side walls that are sloped, which makes the cross-section of the dovetail groove 1*b* gradually decrease from the bottom to the opening, whereby the reliability of the dovetail groove 1*b* limiting and fixing the connected components is improved, and the connection part 31 is prevented from detaching from the dovetail groove 1*b* when the button 2 press the extension part 32. The first sealing ring 3 can be integrally made by injection molding. For example, the installation sleeve 1 can be placed in a mold for molding the first sealing ring 3, and the first sealing ring 3 can be molded in the dovetail groove 1*b* of the installation sleeve 1 by insert molding, such that the assembly process of the first sealing ring 3 and the installation sleeve 1 can be saved, and the tightness and reliability of the connection and fixation of the first sealing ring 3 and the installation sleeve 1 is also improved.

Figure 4:
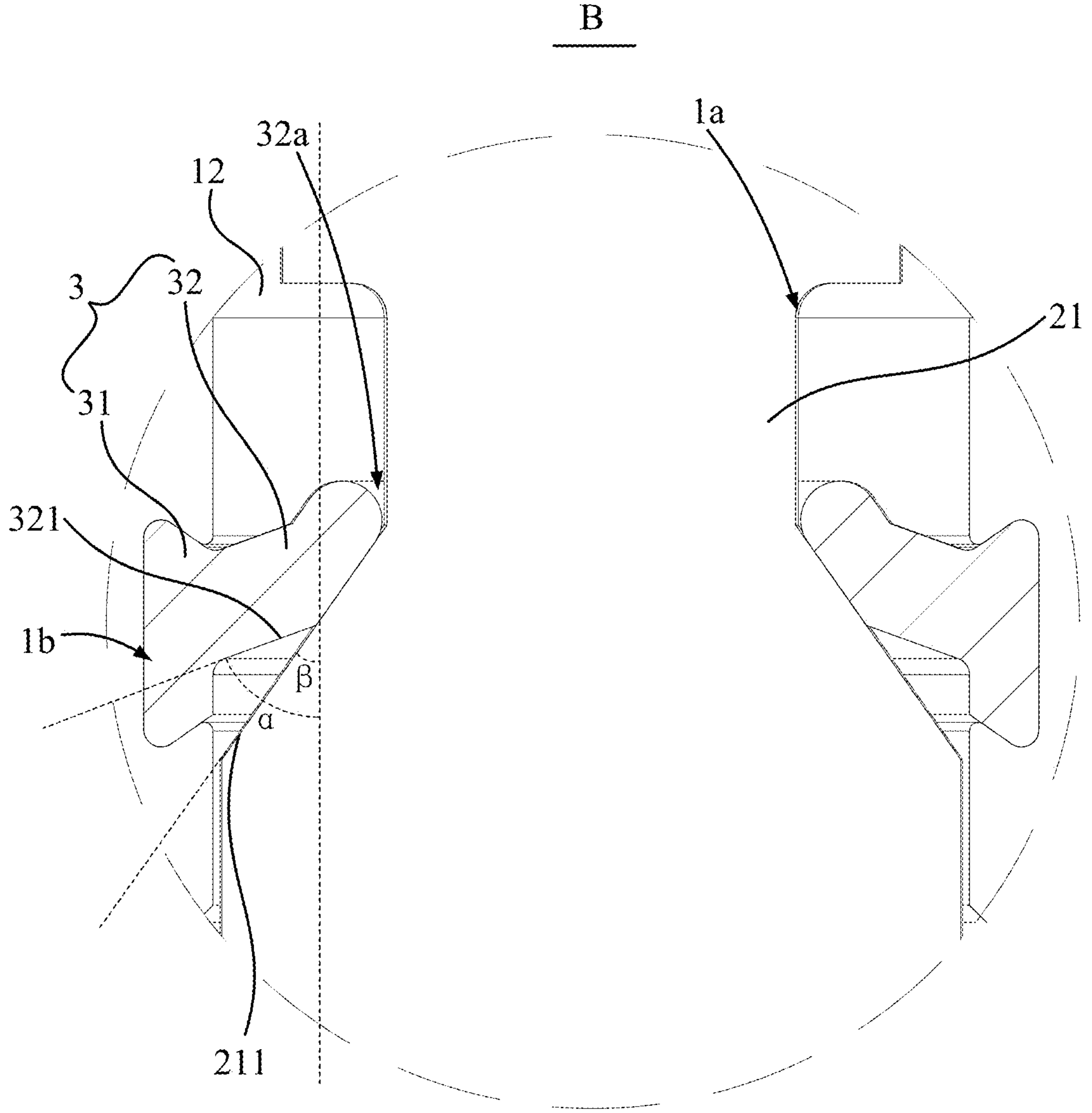
FIG. 4 is an enlarged view of part B in FIG. 3.

In an embodiment of the present application, referring in combination with FIGS. 3 and 4, the angle between the extension part 32 and the axial direction of the through hole 1*a* is defined as a, while the angle between the first conical surface 211 and the axial direction of the through hole 1*a* is defined as β, and α is greater than β.

In this embodiment, by configuring the angle α between the extension part 32 and the axial direction of the through hole 1*a* being greater than the angle β between the first conical surface 211 and the axial direction of the through hole 1*a*, the contact area of the first conical surface 211 of the outer circumferential wall of the button 2 and the second conical surface 321 of the inner circumferential wall of the first sealing ring 3 is gradually increased when the button 2 is transmitted from the pressed state to the non-pressed state and moves upwards relative to the first sealing ring 3, such that the pressing force between the button 2 and the first sealing ring 3 is ensured to gradually increase during the process of the button 2 transmitting from the pressed state to the non-pressed state, and the reliability of the sealing and fitting between the button 2 and the first sealing ring 3 is improved.

In an embodiment of the present application, referring in combination with FIGS. 2 and 3, the installation sleeve 1 includes an outer sleeve 11 and an inner sleeve 12. The outer sleeve 11 passes through the button hole 8*a*. The outer sleeve 11 is provided with a passage hole 11*a*. The hole wall of the passage hole 11*a* is provided with a limit ring groove 11*b*. The inner sleeve 12 is partially accommodated in and limited by the limit ring groove 11*b*. The inner sleeve 12 is provided with the through hole 1*a*. The through hole 1*a* and the passage hole 11*a* are configured to be coaxial.

In this embodiment, the outer sleeve 11 can be fixedly connected to the housing 8 of the wearable device by means of clamping or threaded connection. The button hole 8*a* is opened at the housing 8 of the wearable device. The outer circumferential wall of the outer sleeve 11 and the inner circumferential wall of the button hole 8*a* are sealingly abutted. The inner sleeve 12 and the outer sleeve are configured to be coaxial. The outer circumferential wall of the first sealing ring 3 and the hole wall of the through hole 1*a* of the inner sleeve 12 are connected. By configuring the installation sleeve 1 as a structure of nested outer sleeve 11 and inner sleeve 12, the inner sleeve 12 can be processed independently from the outer sleeve 11, that is, the inner sleeve 12 and the first sealing ring 3 can be integrally made by injection molding, and after that the inner sleeve 12 and the first sealing ring 3 can be placed in the outer sleeve 11 by inserting, thereby realizing the convenient assembly of the first sealing ring 3, the inner sleeve 12 and the outer sleeve. The configuration of the limit ring groove 11*b* on the inner side of the outer sleeve 11 can improve the reliability of the fixation of the inner sleeve 12 to the outer sleeve 11, and thus improving the reliability of the limiting and fitting of the first sealing ring 3 on the inner sleeve 12 and the button 2.

In an embodiment of the present application, referring in combination with FIGS. 2 and 3, a protrusion part 111 and a first clamping groove 11*c* are provided on the hole wall of the passage hole 11*a* along the circumferential direction of the inner sleeve 12. The protrusion part 111 and the first clamping groove 11*c* are spaced apart. The waterproof button structure further includes a circlip 4. One end of the circlip 4 is accommodated in and limited by the first clamping groove 11*c*, while the other end of the circlip 4 passes through the opening of the first clamping groove 11*c* and encloses together with the hole wall of the passage hole 11*a* and the protrusion part 111 to form the limit ring groove 11*b*. The button 2 penetrates the protrusion part 111. One end of the inner sleeve 12 is abutted against and limited by the protrusion part 111, and the other end of the inner sleeve 12 is abutted against and limited by the circlip 4.

In this embodiment, after the first sealing ring 3 and the inner sleeve 12 being integrally made, the inner sleeve 12 can be placed into the passage hole 11*a* of the outer sleeve 11, and make one end of the inner sleeve 12 to be abutted against and limited by the protrusion part 111 of the hole wall of the passage hole 11*a*, then place the circlip 4 into the first clamping groove 12*c* to limit and fix it. In this way, one end of the inner sleeve 12 is abutted against and limited by the protrusion part 111, the other end of the inner sleeve 12 is abutted against and limited by the circlip 4, the outer circumferential wall of the inner sleeve 12 is abutted against and limited by the hole wall of the passage hole 11*a* of the outer sleeve 11, such that the inner sleeve 12 can be reliably installed and fixed in the outer sleeve 11, and convenient assembly of the first sealing ring 3, the inner sleeve 12 and the outer sleeve 11 can be achieved.

In an embodiment of the present application, referring in combination with FIGS. 2 and 3, a second clamping groove 12*a* is provided on the outer wall of the inner sleeve 12 along the circumferential direction of the inner sleeve 12. The waterproof button structure further includes a second sealing ring 5 provided in the second clamping groove 12*a*. The second sealing ring 5 is partially protruded from the opening of the second clamping groove 12*a* and sealingly abutted against the outer sleeve 11.

In this embodiment, by providing the second sealing ring 5 between the outer wall of the inner sleeve 12 and the hole wall of the passage hole 11*a* of the outer sleeve 11, the waterproof sealing between the inner sleeve 12 and the outer sleeve 11 can be achieved, and the moisture from the outside can be prevented from entering the wearable device through the gap between inner sleeve 12 and outer sleeve 11. Since the inner sleeve 12 stays still relative to the outer sleeve 11 when the button 2 is pressed or rotated, the second sealing ring 5 is always fixed between the outer sleeve 11 and the inner sleeve 12 to have a static waterproof sealing effect on the inner sleeve 12 and the outer sleeve 11, that is, the second sealing ring 5 is the static sealing ring between the inner sleeve 12 and the outer sleeve 11, so there will not be strict requirements of surface roughness and geometric tolerance for the design of the second sealing ring 5, which is beneficial for saving the process procedure and process cost of the second sealing ring 5.

In an embodiment of the present application, referring in combination with FIGS. 2 and 3, an end of the outer sleeve 11 is provided with a flange 112. The flange 112 is configured to surround the passage hole 11*a*. The waterproof button structure further includes a lock ring 6. The lock ring 6 is detachably connected to an end of the outer sleeve 11 away from the flange 112. The flange 112 is abutted against and limited by the periphery of one opening of the button hole 8*a*, and the lock ring 6 is abutted against and limited by the periphery of the other opening of the button hole 8*a*.

In this embodiment, the lock ring 6 can be detachably connected to the outer sleeve 11 by means of threaded connection or clamping. When the outer sleeve 11 is placed inside the button hole 8*a*, the flange 112 is abutted against the periphery of the button hole 8*a*. By fixedly installing the lock ring 6 at an end of the outer sleeve 11 away from the flange 112, the lock ring 6 and the flange 112 cooperate to fixedly install the outer sleeve 11 at the housing 8 of the wearable device, thereby achieving fast installation of the outer sleeve 11 at the housing 8 of the wearable device. Exemplarily, the inner circumferential wall of the lock ring 6 is provided with internal thread, and the outer circumferential wall of an end of the outer sleeve 11 away from the flange 112 is provided with external thread. The lock ring 6 can be threaded to the outer sleeve 11 over the internal thread and the external thread, such that the outer sleeve 11 can be conveniently installed to or removed from the housing 8 of the wearable device by fastening or loosing the lock ring 6.

In an embodiment of the present application, referring in combination with FIGS. 2 and 3, a third clamping groove 11*d* is provided on the outer wall of the outer sleeve 11 along the circumferential direction of the outer sleeve 11. The waterproof button structure further includes a third sealing ring 7 provided in the third clamping groove 11*d*. The third sealing ring 7 is partially protruded from the opening of the third clamping groove 11*d* and is sealingly abutted against the hole wall of the button hole 8*a*.

In this embodiment, by providing the third sealing ring 7 between the outer wall of the outer sleeve 11 and the hole wall of the button hole 8*a*, the waterproof sealing between the outer sleeve 11 and the housing 8 of the wearable device can be realized, and the moisture from the outside is prevented from entering the wearable device through the gap between the outer wall of the outer sleeve 11 and the hole wall of the button hole 8*a*. Since the outer sleeve 11 stays still relative to the housing 8 of the wearable device when the button 2 is pressed and rotated, the third sealing ring 7 is always fixed between the outer sleeve 11 and the housing 8 of the wearable device to have a static waterproof sealing effect on the outer sleeve 11 and the housing 8 of the wearable device. That is, the third sealing ring 7 is the static sealing ring between the outer sleeve 11 and the housing 8 of the wearable device, and there will not be strict requirements of surface roughness and geometric tolerance for the design of the third sealing ring 7, which is beneficial for saving the process procedure and process cost of the third sealing ring 7.

In an embodiment of the present application, referring in combination with FIGS. 2 and 3, the button 2 includes a button shaft 21, a button cap 22 and a nut 23. The button shaft passes through the through hole 1*a*. The first conical surface 211 is provided on the outer circumferential wall of the button shaft 21. The button cap 22 is positioned on the outer side of the button hole 8*a*. One side of the button cap 22 away from the button hole 8*a* is provided with a limit recess 22*a*. The nut 23 is provided in the limit recess 22*a*. The button cap 22 and the nut 23 are in threaded connection with an end of the button shaft 21 extending out of the button hole 8*a*.

In this embodiment, the button cap 22 of the button 2 is for the user to press, the nut 23 is for reliably fastening the button cap 22 to the button shaft 21, both the button cap 22 and the nut 23 of the button 2 adopt threaded connection to be fixed to the button shaft 21 of the button 2. The button cap 22 of the button 2 and the nut 23 of the button 2 are equivalent to two nuts in threaded connection with the button shaft 21, so that the anti-loosing principle of double nuts can be utilized to effectively prevent the button 2 from loosing and to ensure the reliability of the button 2 while using.

The configuration of the limit recess 22*a* on the button cap 22 provides an accommodation space for the nut 23, which allows the nut 23 to be hidden in the limit recess 23*a* and does not have a portion protruding from the opening of the limit recess 22*a*. In this way, not only the beauty of the appearance of the button 2 can be improved, but also the nut 23 can be avoided from being unintentionally touched and rotated to detach from the button shaft 21, and resulting in a problem of loosing of the button 2.

In an embodiment of the present application, referring in combination with FIGS. 2 and 3, the outer wall of the button shaft 21 is provided with a stop part 212. When the button cap 22 and the nut 23 is connected to the button shaft 21, one side of the button cap 22 away from the nut 23 is abutted against and limited by the stop part 212.

In this embodiment, when fastening the nut 23, the nut 23 and the stop part 212 can cooperate to clamp the bottom wall of the limit recess 22*a*, that is, the nut 23 and the stop part 212 cooperate to clamp part of the structure of the button cap 22, so as to lock the button cap 22 and realize stable installation of the button cap 22 on the button shaft 21 over the cooperation of the nut 23 and the stop part 212.

Optionally, one side of the button cap 22 away from the nut 23 is provided with an avoidance recess. When the nut 23 and the stop part 212 cooperate to lock the button cap 22, the stop part 212 is positioned in the avoidance recess. The configuration of avoidance recess provides an accommodation space for the stop part 212, so that the nut 23 and the stop part 212 can be respectively placed in the limit recess 22*a* and the avoidance recess on the two sides of the button cap 22, thus the entire thickness of the assembled nut 23, button cap 22 and the stop part 212 can be reduced, and the entire size of the button 2 can be reduced. In addition, when the button shaft 21 axially moves, the side wall of the avoidance recess can be slidably abutted against the outer side wall of the flange 112, thereby guiding the movement of the button shaft 21 over the cooperation of the flange 112 and the avoidance recess, and improving the smoothness when the button 2 is pressed to move.

The present application further proposes a wearable device, which includes but is not limited to a smart watch or a smart bracelet.

Figure 6:
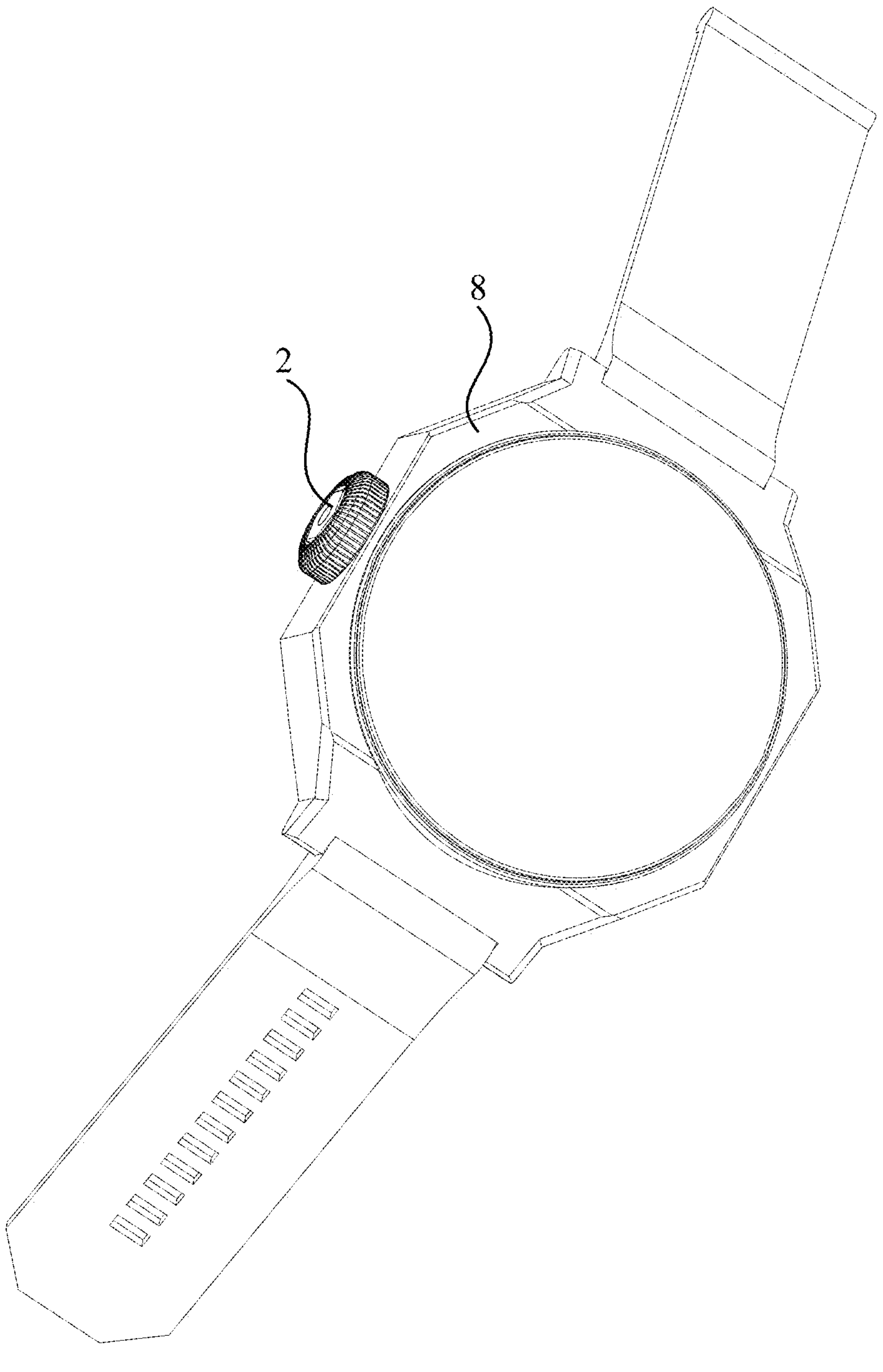
FIG. 6 is a schematic structural view of a wearable device according to an embodiment of the present application.

In an embodiment of the present application, referring to FIG. 6 and in combination with FIG. 2, the wearable device includes the housing 8 and the waterproof button structure in the above-mentioned embodiments. The housing 8 is provided with an accommodation chamber and a button hole 8*a*. The button hole 8*a* is communicated with the accommodation chamber. The button 2 of the waterproof button structure partially passes through the button hole 8*a* and extends into the accommodation chamber.

In this embodiment, the button hole 8*a* is used for installing the installation sleeve 1. The installation sleeve 1 is at least partially accommodated in and limited by the button hole 8*a*, and can be connected and fixed to the housing 8 by means of clamping or threaded connection. The installation sleeve 1 is opened with the through hole 1*a* along its axial direction. The though hole 1*a* and the accommodation chamber inside the housing 8 for installing functional modules of the wearable device are communicated. The button 2 passes through the through hole 1*a* of the installation sleeve 1, and can be detected by the sensor group in the accommodation chamber when rotating or moving along the axial direction of the through hole 1*a*. The wearable device can respond to the operation of button 2 over functional modules that are electrically connected to the sensor group, to further control an execution terminal, such as a display or a speaker, to perform a corresponding action, such as displaying a picture or producing a sound, such that the information interaction between the wearable device and the user is achieved.

The specific structure of the waterproof button structure in this embodiment can be referred to the above-mentioned embodiments. Since this wearable device adopts all the technical solutions of all the above-mentioned embodiments, it therefore has at least all the beneficial effects brought by the technical solutions of the above-mentioned embodiments, and there is no need to repeat them here.

In an embodiment of the present application, referring to FIG. 6 and in combination with FIGS. 1 and 2, the wearable device further includes a first sensor 9 and a second sensor 10 that are provided in the accommodation chamber. The first sensor 9 is provided at the axial direction of the button 2 for detecting an axial movement of the button 2. The second sensor 10 is provided at one side of the button 2 for detecting a rotation of the button 2.

In this embodiment, the wearable device has functions of detecting whether the button 2 is pressed and detecting whether the button 2 is rotated. The pressing detection function is realized by the first sensor 9, while the rotation detection function is realized by the second sensor 10. Specifically, when the button 2 is subjected to a pressing force to translate axially, the button 2 moves close to the first sensor 9, and the button 2 can contact and press the elastic contact sheet on the sensor, thus the first sensor 9 can detect the pressing action of the button 2. At this point, the button 2 presses and pushes the first sealing ring 3 to deform, which makes the periphery of the limit hole 32*a* on the sealing ring deform, thus makes a portion of the second conical surface 321 close to the limit hole 32*a* being abutted against and limited by the first conical surface 211, thereby realizing the waterproof sealing of button 2. When the pressing force applied to the button 2 is removed, the elastic contact sheet recovers and pushes the button 2 to reset, which makes the contact area of the first conical surface 211 on the button 2 and the second conical surface on the sealing ring gradually increase, thereby realizing the waterproof sealing of button 2. When the button 2 is rotated, as different positions of the outer circumferential wall of the button 2 pass by the second sensor 10, the light change reflected from the button 2 can be detected by the second sensor 10 and thus the rotation of the button 2 can also be detected. The configuration of first sensor 9 the second sensor 10 allows the wearable device to detect the action of the button 2 in time, and can accurately respond to the operation that the user have on the button 2 in time. The first sensor 9 may be a touch sensor, while the second sensor 10 may be a photoelectric sensor or a grating sensor, etc.

The above-mentioned are just some embodiments of the present application, and are not intended to limit the scope of the present application. All other equivalent structural variations made by using the content of drawings and the detailed description of the present application, or direct/indirect application on other related technical fields should all be included in the scope of the present application.

What is claimed is:

1. A waterproof button structure applied to a wearable device, wherein the wearable device is provided with a button hole, and the waterproof button structure comprises: an installation sleeve passing through the button hole and provided with a through hole; a button passing through the through hole and capable of moving along an axial direction of the through hole or rotating relative to the installation sleeve, wherein an outer wall of the button is provided with a first conical surface along a circumferential direction of the button; and a first sealing ring, wherein an outer circumferential wall of the first sealing ring is connected to a hole wall of the through hole, and the first sealing ring is sleeved on a periphery of the button; an inner wall of the first sealing ring is provided with a second conical surface along a circumferential direction of the first sealing ring, and the second conical surface and the first conical surface are at least partially abutted against and limited by each other; wherein the first sealing ring comprises: a connection part, wherein the connection part is configured to be ring-shaped, and an outer circumferential wall of the connection part is connected to the hole wall of the through hole; and an extension part, wherein the extension part is circumferentially provided on an inner circumferential wall of the connection part; the extension part is configured to be conical, and an end of the extension part away from the connection part is provided with a limit hole; the button passes through the limit hole, and the second conical surface is provided on an inner circumferential wall of the extension part.

2. The waterproof button structure according to claim 1, wherein the hole wall of the through hole is provided with a dovetail groove, and the dovetail groove is provided along a circumferential direction of the installation sleeve; and the connection part is accommodated in and limited by the dovetail groove, and the extension part passes through an opening of the dovetail groove to extend into the through hole.

3. The waterproof button structure according to claim 1, wherein an angle between the extension part and the axial direction of the through hole is defined as $\alpha$, an angle between the first conical surface and the axial direction of the through hole is defined as $\beta$, and $\alpha$ is greater than $\beta$.

4. The waterproof button structure according to claim 1, wherein the installation sleeve comprises:

an outer sleeve, wherein the outer sleeve passes through the button hole and is provided with a passage hole, and a hole wall of the passage hole is provided with a limit ring groove; and an inner sleeve, wherein the inner sleeve is partially accommodated in and limited by the limit ring groove; the inner sleeve is provided with the through hole, and the through hole and the passage hole are configured to be coaxial.

5. The waterproof button structure according to claim 4, wherein the hole wall of the passage hole is provided with a protrusion part and a first clamping groove along a circumferential direction of the inner sleeve, and the protrusion part and the first clamping groove are spaced apart;

the waterproof button structure further comprises a circlip; one end of the circlip is accommodated in and limited by the first clamping groove, and the other end of the circlip passes through an opening of the first clamping groove and encloses together with the hole wall of the passage hole and the protrusion part to form the limit ring groove; and the button penetrates the protrusion part; one end of the inner sleeve is abutted against and limited by the protrusion part, and the other end of the inner sleeve is abutted against and limited by the circlip.

6. The waterproof button structure according to claim 4, wherein an outer wall of the inner sleeve is provided with a second clamping groove along a circumferential direction of the inner sleeve; and the waterproof button structure further comprises a second sealing ring provided in the second clamping groove, and the second sealing ring is partially protruded from an opening of the second clamping groove and sealingly abutted against the outer sleeve.

7. The waterproof button structure according to claim 4, wherein an end of the outer sleeve is provided with a flange, and the flange is configured to surround the passage hole; and the waterproof button structure further comprises a lock ring detachably connected to an end of the outer sleeve away from the flange; the flange is abutted against and limited by a periphery of one opening of the button hole, and the lock ring is abutted against and limited by a periphery of the other opening of the button hole.

8. The waterproof button structure according to claim 4, wherein an outer wall of the outer sleeve is provided with a third clamping groove along a circumferential direction of the outer sleeve; and the waterproof button structure further comprises a third sealing ring provided in the third clamping groove; the third sealing ring is partially protruded from an opening of the third clamping groove and sealingly abutted against a hole wall of the button hole.

9. The waterproof button structure according to claim 1, wherein the button comprises:

a button shaft passing through the passage hole, wherein the first conical surface is provided on an outer circumferential wall of the button shaft;

a button cap located on an outer side of the button hole, wherein a side of the button cap away from the button hole is provided with a limit recess; and a nut provided in the limit recess, wherein the button cap and the nut are in threaded connection with an end of the button shaft extending out of the button hole.

10. The waterproof button structure according to claim 9, wherein the outer circumferential wall of the button shaft is provided with a stop part; and a side of the button cap away from the nut is abutted against and limited by the stop part when the button cap and the nut are connected to the button shaft.

11. A wearable device, comprising:

a housing provided with an accommodation chamber and a button hole communicated with the accommodation chamber; and the waterproof button structure according to claim 1, wherein the button of the waterproof button structure partially passes through the button hole and extends into the accommodation chamber.

12. The wearable device according to claim 11, further comprising:

a first sensor and a second sensor both provided in the accommodation chamber;

wherein the first sensor is provided at an axial direction of the button for detecting an axial movement of the button; and the second sensor is provided at a side of the button for detecting a rotation of the button.

* * * * *